United States Patent
Jean-Baptiste-Dit-Dominique et al.

(10) Patent No.: US 11,261,281 B2
(45) Date of Patent: Mar. 1, 2022

(54) BLOCK POLYMERS

(71) Applicant: COMPAGNIE GENERALE DES ETABLISSEMENTS MICHELIN, Clermont-Ferrand (FR)

(72) Inventors: François Jean-Baptiste-Dit-Dominique, Clermont-Ferrand (FR); Vincent Lafaquiere, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 19 days.

(21) Appl. No.: 16/652,348

(22) PCT Filed: Oct. 11, 2018

(86) PCT No.: PCT/FR2018/052525
§ 371 (c)(1),
(2) Date: Mar. 30, 2020

(87) PCT Pub. No.: WO2019/077235
PCT Pub. Date: Apr. 25, 2019

(65) Prior Publication Data
US 2020/0239616 A1    Jul. 30, 2020

(30) Foreign Application Priority Data

Oct. 19, 2017 (FR) ...................... 17/59838

(51) Int. Cl.
| | | |
|---|---|---|
| *C08F 293/00* | (2006.01) |
| *C08F 295/00* | (2006.01) |
| *C08F 236/06* | (2006.01) |
| *C08F 297/06* | (2006.01) |
| *C08F 4/52* | (2006.01) |
| *C08F 212/08* | (2006.01) |
| *C08F 210/02* | (2006.01) |

(52) U.S. Cl.
CPC ............ *C08F 293/005* (2013.01); *C08F 4/52* (2013.01); *C08F 210/02* (2013.01); *C08F 212/08* (2013.01); *C08F 236/06* (2013.01); *C08F 295/00* (2013.01); *C08F 297/06* (2013.01)

(58) Field of Classification Search
CPC .. C08F 293/005; C08F 297/06; C08F 295/00; C08F 210/02; C08F 4/52; C08F 236/06; C08F 212/08
USPC .......................................... 526/340
See application file for complete search history.

(56) References Cited

U.S. PATENT DOCUMENTS 4,669,518 A * 6/1987 Hargis .................... C08L 53/02
152/209.1
2012/0165492 A1  6/2012 Thuilliez et al.

FOREIGN PATENT DOCUMENTS

GB          1156932 A  *  7/1969
WO       2007054224 A2     5/2017

OTHER PUBLICATIONS

Zhenxi Wang et al.: "Preparation, kinetics and microstructures of well-defined PS-b-PS/Bd diblock copolymers via RAFT mini emulsion polymerization", Journal of Polymer Research, vol. 20, No. 11, Oct. 14, 2013 (Oct. 14, 2013).*
International Search Report and Written Opinion corresponding to PCT/FR2018/052525 dated Jan. 16, 2019.
International Search Report and Written Opinion with translation corresponding to PCT/FR2018/052525 dated Jan. 16, 2019.
Zhenxi Wang et al: "Preparation, kinetics and microstructures of well-defined PS-b-PS/Bd diblock copolymers via RAFT mini emulsion polymerization", Journal of Polymer Research, vol. 20, No. 11, Oct. 14, 2013 (Oct. 14, 2013), XP055483158, NL, ISSN: 1022-9760, DOI: 10.1007/sl0965-013-0288-0 Paragraphe p. 10-11. Molecular structure of the copolymers.
Hugo Xicohtencatl-Serrano et al: "Synthesis and characterization of poly (styrene-b-[(butadiene) 1-x-(ethylene-co-butylene) x]-b-styrene) star-like molecular polymers produced by partial hydrogenation of SBS", Polymer Engineering and Science., vol. 54, No. 10, Oct. 20, 2013 (Oct. 20, 2013), pp. 2332-2344, XPO55483381, us ISSN: 0032-3888, DOI: 10.1O02/pen.23796.

* cited by examiner

*Primary Examiner* — William K Cheung
(74) *Attorney, Agent, or Firm* — Dickinson Wright PLLC

(57) ABSTRACT

A block polymer comprising a first block and a second block is provided. The first block contains aromatic α-mono-olefin units, and the second block contains both 1,3-diene units and mono-olefin units.

17 Claims, No Drawings

BLOCK POLYMERS

This application is a 371 national phase entry of PCT/FR2018/052525, filed on Oct. 11, 2018, which claims benefit of French Patent Application No. 17/59838, filed Oct. 19, 2017, the entire contents of which are incorporated herein by reference for all purposes.

BACKGROUND

1. Technical Field

The present invention relates to the field of block polymers comprising two blocks resulting respectively from the polymerization of an aromatic olefin and from the polymerization of olefins.

2. Related Art

It is always advantageous to develop new block polymers which exhibit a novel microstructure for the purpose of always providing different materials. In point of fact, block polymers one of the blocks of which results from the polymerization of an aromatic α-mono-olefin and another of which results from the copolymerization of a 1,3-diene with certain mono-olefins are not known.

SUMMARY

By using a specific process, the Applicant Company has discovered the synthesis of a new block polymer. This polymer has a specific composition, since one of the blocks has a microstructure accessible by anionic polymerization and one of the other blocks has a microstructure accessible by polymerization carried out in the presence of a metallocene.

Thus, the invention relates to a polymer comprising a first block and a second block, the first block comprising monomer units of a first aromatic α-mono-olefin, the second block comprising monomer units of a second 1,3-diene and monomer units of a second olefin selected from the group consisting of ethylene, α-mono-olefins and their mixtures, the first aromatic α-mono-olefin being of formula $CH_2=CH-Ar$, Ar representing a substituted or unsubstituted aromatic group, provided that, if the second block is a copolymer chain of a 1,3-diene and of an aromatic α-mono-olefin of formula $CH_2=CH-Ar'$, Ar' representing a substituted or unsubstituted aromatic group, the diene units of trans-1,4-structure in the second block represent more than 80 mol % of the diene units of 1,4-structure of the second block.

DETAILED DESCRIPTION OF EXAMPLE EMBODIMENTS

Any interval of values denoted by the expression "between a and b" represents the range of values greater than "a" and less than "b" (that is to say, limits a and b excluded), whereas any interval of values denoted by the expression "from a to b" means the range of values extending from "a" up to "b" (that is to say, including the strict limits a and b).

The compounds mentioned in the description can be of fossil or biosourced origin. In the latter case, they can, partially or completely, result from biomass or be obtained from renewable starting materials resulting from biomass. The monomers in particular are concerned.

The block polymer in accordance with the invention which comprises two blocks is advantageously a diblock polymer.

The block polymer has the essential characteristic of being formed of a first block which comprises monomer units of a first aromatic α-mono-olefin. The first aromatic α-mono-olefin is an α-mono-olefin of formula $CH_2=CH-Ar$, Ar representing a substituted or unsubstituted aromatic group. Preferably, the aromatic group is a phenyl group or an aryl group. The first aromatic α-mono-olefin is more preferentially styrene or a styrene substituted by one or more alkyl groups, more preferentially still styrene.

According to one embodiment of the invention, the first block comprises more than 0 mol % to 100 mol % of monomer units of the first aromatic α-mono-olefin and from 0 mol % to less than 100 mol % of monomer units of a first 1,3-diene. The first block can thus be a homopolymer of the first aromatic α-mono-olefin or a copolymer of the first aromatic α-mono-olefin and of a first 1,3-diene. The first 1,3-diene is preferentially 1,3-butadiene, isoprene or their mixture.

According to a specific embodiment of the invention, the first block is a homopolymer chain of the first aromatic α-mono-olefin, preferably a polystyrene chain.

According to another specific embodiment of the invention, the first block is a copolymer chain of the first aromatic α-mono-olefin and of the first 1,3-diene, in particular a copolymer chain of styrene and of 1,3-butadiene.

According to another embodiment of the invention, the first block contains more than 10 monomers units, preferentially more than 100 monomer units. This embodiment is particularly advantageous when the first block is a homopolymer of the first aromatic α-mono-olefin as the first block exhibits a glass transition temperature which is much greater than ambient temperature, in particular greater than 50° C., which can confer specific properties on the block polymer.

The first block of the block polymer in accordance with the invention is preferably an atactic chain, more preferentially an atactic polystyrene.

The block polymer also has another essential characteristic of being formed of a second block which comprises monomer units of a second 1,3-diene and monomer units of a second olefin.

The second 1,3-diene can be identical to the first 1,3-diene or can be different from it. The second 1,3-diene is preferentially 1,3-butadiene, isoprene or their mixture, more preferentially 1,3-butadiene. The second olefin is selected from the group consisting of ethylene, α-mono-olefins and their mixtures. The α-mono-olefin can be aliphatic or aromatic. The aliphatic α-mono-olefin is an alkene preferably having from 3 to 18 carbon atoms, such as propene, 1-butene, 1-hexene, 1-octene, 1-hexadecene or their mixtures. The aromatic α-mono-olefin is an α-mono-olefin of formula $CH_2=CH-Ar'$, Ar' representing a substituted or unsubstituted aromatic group, preferably phenyl or aryl. The aromatic α-mono-olefin- of formula $CH_2=CH-Ar'$ can be identical to the first aromatic α-mono-olefin or can be different from it. It is preferentially styrene or a styrene substituted by one or more alkyl groups, more preferentially styrene.

When the second block is a copolymer chain of a 1,3-diene and of an aromatic α-mono-olefin, the diene units of trans-1,4-structure in the second block represent more than 80 mol % of the diene units of 1,4-structure of the second block.

According to one embodiment of the invention, the diene units of trans-1,4-structure in the second block preferentially represent more than 80 mol % of the diene units of 1,4-structure of the second block, more preferentially more than 90 mol % of the diene units of 1,4-structure of the second block.

According to one embodiment of the invention, the diene units of trans-1,4-structure in the block polymer preferentially represent more than 70 mol % of the diene units of 1,4-structure of the block polymer, more preferentially more than 80 mol % of the diene units of 1,4-structure of the block polymer.

According to one embodiment in the invention, the second block comprises more than 0 mol % to 50 mol % of the monomer units of the second 1,3-diene and from 50 mol % to less than 100 mol % of the monomer units of the second olefin.

According to a preferred embodiment of the invention, the second block is a copolymer chain of 1,3-butadiene and of ethylene or a terpolymer chain of 1,3-butadiene, of ethylene and of an α-mono-olefin, the α-mono-olefin preferentially being styrene. Preferably, the polymer is a diblock, the first block being a polystyrene chain, the second block being a copolymer chain of 1,3-butadiene and of ethylene or a terpolymer chain of 1,3-butadiene, of ethylene and of an α-mono-olefin, the α-mono-olefin preferentially being styrene. Also preferentially, the polymer is a diblock, the first block being a copolymer chain of styrene and of 1,3-butadiene, the second block being a copolymer chain of 1,3-butadiene and of ethylene or a terpolymer chain of 1,3-butadiene, of ethylene and of an α-mono-olefin, the α-mono-olefin preferentially being styrene.

According to a preferred embodiment of the invention, the block polymer contains 6-membered cyclic units which are saturated hydrocarbon units, preferably 1,2-cyclohexanediyl units. The cyclic units result from a specific insertion of the ethylene and 1,3-butadiene monomers into the polymer chain in addition to the conventional ethylene and 1,3-butadiene units, respectively —($CH_2$—$CH_2$)—, —($CH_2$—CH=CH—$CH_2$)— and —($CH_2$—CH(CH=$CH_2$))—. The mechanism for obtaining such a microstructure is, for example, described in the document Macromolecules, 2009, 42, 3774-3779.

In the block polymer in accordance with the invention, the first block and the second block are preferably directly bonded to one another. In other words, the first block is preferentially covalently bonded to the second block by directly joining a carbon atom of a monomer unit of the first block to a carbon atom of a monomer unit of the second block.

The block polymers in accordance with the invention can be prepared by a process which confers the novel microstructure of the block polymer, in particular the composition of each of the blocks, the specific feature of direct joining of the two blocks and the presence of saturated 6-membered cyclic hydrocarbon structures in the block polymer.

The process for the preparation of the block polymer comprises a stage a) and a stage b), stage a) being the reaction of a rare earth metallocene and of a living anionic polymer of a first monomer, stage b) being the polymerization of a second monomer in the presence of the reaction product of stage a). The first monomer is the first aromatic α-mono-olefin as defined above or a monomer mixture containing the first aromatic α-mono-olefin and the first 1,3-diene as defined above. The second monomer is a mixture of the second 1,3-diene and of the second olefin as are defined above. The process thus consists in forming the second block of the block polymer by subsequent polymerization after having prepared a living anionic polymer beforehand. After the process, the living anionic polymer forms an integral part of the block polymer in the form of the first block of the block polymer. For the implementation of the process, the living anionic polymer is of use for the requirements of the invention as agent for alkylation of metallocene in order to activate the metallocene with regard to the polymerization of the second monomer. Stage a) is an alkylation reaction of the metallocene by the living anionic polymer. Preferably, the ratio of the number of moles of living polymer to the number of moles of rare earth atoms in the metallocene varies within a range extending from 0.8 to 1.2.

As the alkylating agent is the living anionic polymer, the addition of an alkylating agent of another nature, such as a compound having a carbon-metal bond, in particular a C—Al or C—Mg bond, is unnecessary in the process. Specifically, the addition of such a compound, such as, for example, a trialkylaluminium or a dialkylmagnesium, would have the consequence of reducing the yield of block polymer and of promoting the presence of homopolymer. The medium for polymerization of the second monomer is preferentially devoid of compound having a C—Al or C—Mg bond.

The living anionic polymer is thus conventionally obtained by anionic polymerization of the first monomer in a solvent known as "polymerization solvent". The polymerization solvent can be any hydrocarbon solvent known for being used in the polymerization of 1,3-diene monomers and aromatic α-mono-olefin monomers. Preferably, the polymerization solvent is cyclohexane, methylcyclohexane or toluene.

The solvent for polymerization of the first monomer can comprise an additive in order to control the microstructure of the polymer chain and the rate of the polymerization reaction. This additive can be a polar agent, such as an ether or a tertiary amine, preferably a tertiary amine, more preferentially a "chelating" tertiary amine, such as N,N,N',N'-tetramethylethylenediamine. The additive is generally used in a small amount, in particular in order to limit the reactions for deactivation of the propagating sites of the anionic polymerization. The amount of additive in the polymerization solvent, conventionally indexed to the number of carbon-metal bonds in the polymerization medium, is adjusted according to the desired microstructure of the polymer chain and this depends on the complexing of power of the additive. The additive, in particular N,N,N',N'-tetramethylethylenediamine, is preferentially used at a content of at most 1 carbon-metal bond equivalent, more preferentially at a content of from 0.01 to 0.5 carbon-metal bond equivalent.

The ratio of the amount of solvent to the amount of first monomer of use in the formation of a living polymer is selected by a person skilled in the art according to the viscosity desired for the living polymer solution. This viscosity depends not only on the concentration of the polymer solution but also on many other factors, such as the length of the polymer chains, the nature of the counterion of the living polymer, the intermolecular interactions between the living polymer chains, the complexing power of the solvent, the temperature of the polymer solution. Consequently, a person skilled in the art adjusts the amount of solvent on a case by case basis.

In the reaction for initiation of the polymerization reaction, use is made of a compound known as initiator of the anionic polymerization of the monomers of use for the requirements of the invention. Preferably, the initiator is a compound which exhibits a carbon-metal bond. The initiator is used at a content selected as a function of the chain length desired for the living polymer and can thus vary to a great extent.

Preferably, the living polymer is prepared by polymerization of the first monomer initiated by an initiator which is a lithium compound. Mention may be made, as lithium initiator, of the organolithium compounds, such as n-butyllithium, sec-butyllithium and tert-butyllithium, commonly used in the anionic polymerization of the monomers of use for the requirements of the invention.

The polymerization temperature for forming the living polymer can vary to a great extent. It is selected as a function in particular of the stability of the carbon-metal bond in the polymerization solvent, of the relative rate coefficients of the initiation reaction and of the propagation reaction, of the targeted microstructure of the living polymer. Conventionally, it varies within a range extending from −20 to 100° C., preferentially from 20 to 70° C.

The metallocene of use for the requirements of the invention in stage a) is a rare earth metallocene. It should be remembered that rare earths are metals and denote the elements scandium, yttrium and the lanthanides, the atomic number of which varies from 57 to 71. The rare earth is preferentially a lanthanide, more preferentially neodymium (Nd).

Preferably, the rare earth metallocene comprises the unit of formula (Ia) or (Ib):

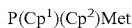   (Ia)

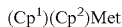   (Ib)

Met denoting a rare earth metal atom, $Cp^1$ and $Cp^2$, which are identical or different, being selected from the group consisting of cyclopentadienyl groups, indenyl groups and fluorenyl groups, it being possible for the groups to be substituted or unsubstituted, P being a group which bridges the two $Cp^1$ and $Cp^2$ groups and which comprises at least one silicon or carbon atom.

Mention may be made, as substituted cyclopentadienyl, fluorenyl and indenyl groups, of those substituted by alkyl radicals having from 1 to 6 carbon atoms or by aryl radicals having from 6 to 12 carbon atoms. The choice of the radicals is also directed by the accessibility to the corresponding molecules, which are the substituted cyclopentadienes, fluorenes and indenes, because the latter are available commercially or can be easily synthesized.

In the present patent application, in the case of the cyclopentadienyl group, the 2 (or 5) position denotes the position of the carbon atom which is adjacent to the carbon atom to which the bridge P is attached, as is represented in the diagram below.

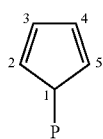

Mention may more particularly be made, as cyclopentadienyl group substituted in the 2 and 5 positions, of the tetramethylcyclopentadienyl group.

In the case of the indenyl group, the 2 position denotes the position of the carbon atom which is adjacent to the carbon atom to which the bridge P is attached, as is represented in the diagram below.

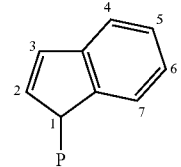

Mention may more particularly be made, as indenyl groups substituted in the 2 position, of 2-methylindenyl, 2-phenylindenyl.

Mention may more particularly be made, as substituted fluorenyl groups, of the 2,7-di(tert-butyl)fluorenyl and 3,6-di(tert-butyl)fluorenyl groups. The 2, 3, 6 and 7 positions respectively denote the position of the carbon atoms of the rings, as is represented in the diagram below, the 9 position corresponding to the carbon atom to which the bridge P is attached.

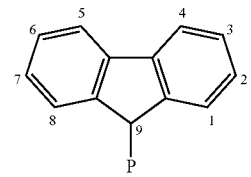

Preferably, $Cp^1$ and $Cp^2$, which are identical or different, each represent an unsubstituted cyclopentadienyl group, a substituted cyclopentadienyl group, an unsubstituted fluorenyl group or a substituted fluorenyl group. Advantageously, $Cp^1$ represents a substituted or unsubstituted cyclopentadienyl group and $Cp^2$ represents a substituted or an unsubstituted fluorenyl group; preferably, $Cp^1$ represents an unsubstituted cyclopentadienyl group and $Cp^2$ represents an unsubstituted fluorenyl group.

In the formula (I-a), the Met atom is connected to a ligand molecule consisting of the two $Cp^1$ and $Cp^2$ groups connected together by the bridge P. Preferably, the symbol P, denoted under the term of bridge, corresponds to the formula $MR^3R^4$, M representing a silicon or carbon atom, preferably a silicon atom, and $R^3$ and $R^4$, which are identical or different, representing an alkyl group comprising from 1 to 20 carbon atoms. More preferentially, the bridge P is of formula $SiR^3R^4$, $R^3$ and $R^4$ being as defined above. More preferentially still, P corresponds to the formula $SiMe_2$.

The metallocene can be of formula (II-a) or (II-b), preferably of formula (IIa),

   (II-a)

   (II-b)

in which:

Met represents a rare earth metal atom, the symbol G denoting a halogen atom selected from the group consisting of chlorine, fluorine, bromine and iodine or a group comprising the borohydride ($BH_4$) unit or an amide unit, $Cp^1$, $Cp^2$ and P being as defined above, including according to the preferred alternative forms, b being equal to 1 or 2.

When G denotes a halogen atom, G is preferentially a chlorine atom.

Advantageously, in the formula (II-a) or (II-b), $Cp^1$ represents a substituted or unsubstituted cyclopentadienyl group and $Cp^2$ represents a substituted or unsubstituted fluorenyl group; preferably, $Cp^1$ represents an unsubstituted cyclopentadienyl group and $Cp^2$ represents an unsubstituted fluorenyl group.

Whether the metallocene is of formula (I-a), (I-b), (II-a) or (II-b), the symbol Met preferably represents a lanthanide (Ln) atom, the atomic number of which varies from 57 to 71, more preferably a neodymium (Nd) atom.

The metallocene is preferably a lanthanide borohydride metallocene or a lanthanum halide metallocene, in particular a lanthanide chloride metallocene. Mention may be made, as metallocene of use in the invention, of the metallocenes of formula (III), (IV), (V), (VI), (VII), (VIII), (IX) or (X).

$$[Me_2Si(C_5H_4)(C_{13}H_8)NdCl] \quad (III)$$

$$[Me_2Si(C_5H_4)(C_{13}H_8)Nd(BH_4)_2Li(THF)] \quad (IV)$$

$$[Me_2Si(C_5H_4)(C_{13}H_8)Nd(BH_4)(THF)] \quad (V)$$

$$[Me_2Si(C_{13}H_8)_2NdCl] \quad (VI)$$

$$[Me_2Si(C_{13}H_8)_2Nd(BH_4)_2Li(THF)] \quad (VII)$$

$$[Me_2Si(C_{13}H_8)_2Nd(BH_4)(THF)] \quad (VIII)$$

$$[\{Me_2Si(C_{13}H_8)_2Nd(BH_4)_2Li(THF)\}_2] \quad (IX)$$

$$[Me_2Si(C_{13}H_8)_2Nd(BH_4)] \quad (X)$$

The metallocene can be in the form of a crystalline or noncrystalline powder or also in the form of monocrystals. The metallocene can be provided in a monomer or dimer form, these forms depending on the method of preparation of the metallocene, such as, for example, as described in the applications WO 2007054223 and WO 2007054224. The metallocene can be prepared conventionally by a process analogous to that described in the documents EP 1 092 731, WO 2007054223 and WO 2007054224, in particular by reaction under inert and anhydrous conditions of the salt of an alkali metal of the ligand with a rare earth salt, such as a rare earth halide or borohydride, or a salt of a metal of Group 4 in an appropriate solvent, such as an ether, such as diethyl ether or tetrahydrofuran, or any other solvent known to a person skilled in the art. After reaction, the metallocene is separated from the reaction by-products by techniques known to a person skilled in the art, such as filtration or precipitation from a second solvent. The metallocene is finally dried and isolated in the solid form.

Typically, the process is carried out by the addition of the metallocene to the medium for the polymerization of the first monomer containing the living anionic polymer. As the carbon-metal bonds present in the medium for the polymerization of the first monomer are somewhat subject to deactivation in the absence of monomer to be polymerized, the addition of the metallocene is preferably carried out as soon as possible after the synthesis of the living anionic polymer. As is known to a person skilled in the art, the reactions and also the handling of the monomers, of the metallocene of the living anionic polymer, of the polymerization solvent are carried out under anhydrous conditions and under an inert atmosphere.

The metallocene is preferentially brought into contact with the living anionic polymer at a temperature close to ambient temperature (23° C.), for example at ambient temperature. This contacting operation causes the activation of the metallocene by the living anionic polymer. In other words, the metallocene is rendered active with regard to the polymerization by bringing it into contact with the living anionic polymer. The introduction of the second monomer into the solution containing the activated metallocene triggers the subsequent polymerization of the second monomer. The polymerization is carried out in accordance with the documents EP 1 092 731, WO 2004035639 and WO 2007054224.

Once the desired degree of conversion of the polymerization reaction of the second monomer has been reached, the polymerization reaction is halted by a terminating agent, such as, for example, a compound having an acid proton, such as an alcohol. The block polymer can be recovered, in particular by separating it from the reaction medium, for example by coagulating it in a solvent which brings about its coagulation or by removing the polymerization solvent and any residual monomer under reduced pressure or under the effect of a steam distillation (stripping operation).

The process makes it possible to synthesize the block polymers in accordance with the invention with a high yield, typically of at least 90%, and thus avoids the stages of separation and of purification of the block polymer. The high yields of block polymers also relate to the synthesis of block polymers, each of the blocks of which has a number-average molar mass of greater than 5000 g/mol.

The process thus results in novel block polymers. As the first block and the second block are synthesized by different polymerization systems, the process makes it possible to combine microstructures accessible by anionic polymerization and microstructures accessible by polymerization catalysed in the presence of a metallocene. In particular, a broad glass transition temperature range can be achieved for the first block, while a range of crystallinity for the second block is also possible. Furthermore, the relative proportion of the block in the block polymer can vary to a great extent. For example, the first block can represent from 0.1 to 99.9% by weight of the block polymer.

While the block polymer is advantageously a diblock polymer, the block polymer in accordance with the invention is not limited to a diblock polymer and can comprise other blocks. This is because, in the preparation process described, the alkylating agent can itself result from the subsequent polymerization of different monomer feedstocks and, in this case, it itself comprises several blocks. Furthermore, the process also makes possible the addition of different monomer feedstocks in stage b), which can then bring about the formation of block of different composition from the second block subsequent to the second block.

The invention and its advantages will be easily understood in the light of the description and of the exemplary embodiments which follow, given by way of illustration and without limitation.

EXEMPLARY EMBODIMENTS

1) Determination of the Glass Transition Temperature of the Polymers:

The glass transition temperature is measured by means of a differential scanning calorimeter according to Standard ASTM D3418 (1999).

2) Determination of the Melting Point of the Polymers:

The melting point is measured by means of a differential scanning colorimeter according to the following procedure: under a helium atmosphere, first rise in temperature from ambient temperature to 100° C., quenching down to −150° C., second rise in temperature from −150° C. to 200° C. according to a gradient of 20° C./min.

Sample brought from 25° C. to −150° C.
   Isotherm at −150° C. for 5 minutes
   Heating from −150° C. to +200° C.; at 20° C./min
   Isotherm at +200° C. for 5 minutes
   Cooling from +200° C. to −150° C.; at 20° C./min
   Isotherm at −150° C. for 5 minutes
   Heating from −150° C. to +200° C.; at 20° C./min 3) Preparation of the Polymers:

The toluene and the 1,3-butadiene were purified over an alumina guard. The butyllithium originates from Aldrich (1.4 mol·L$^{-1}$) in hexane and was used without additional purification. The metallocenes [Me$_2$SiFlu$_2$Nd(BH$_4$)$_2$Li(THF)]$_2$ and [Me$_2$SiCpFluNd(BH$_4$)$_2$Li(THF)]$_2$ were prepared according to the protocol described in Patent Applications FR 2 893 028 and FR 2 893 029.

The block polymers are prepared according to the procedure described below. The operating conditions specific to each synthesis appear in Tables 1 and 2.

A 0.19 mol/l solution of butyllithium in toluene (0.5 ml) containing, if appropriate, N,N,N',N'-tetramethylethylenediamine (TMEDA) is added to a solution of a first monomer (M1) in toluene (100 ml) prepared in a Steinie bottled rendered inert with nitrogen. The reaction medium is subsequently stirred at 60° C. for 1 h 30 unless otherwise indicated. After this time has elapsed, during which time the polymerization of M1 takes place, the living anionic polymer solution obtained is subsequently decanted using a hollow needle into a Steinie bottle rendered inert with argon and containing the metallocene (1 or 2). The reaction mixture is stirred at ambient temperature for 5 minutes until all of the metallocene has alkylated and passed into solution. The second monomer (M2) is subsequently introduced according to an amount of 1 g into the reaction medium. The reaction medium is stirred at 60° C. for 2 h. After the reaction, the reaction medium is depressurized and 1 ml of ethanol is added in order to halt the polymerization reaction. 0.2 ml of a solution of Santoflex 13 in toluene (100 g/l) is added and the polymer solution is placed under partial vacuum and flushing with nitrogen at 60° C. for 24 h.

The metallocene 1 is [Me$_2$SiFlu$_2$Nd(BH$_4$)$_2$Li(THF)]$_2$; the metallocene 2 is [Me$_2$SiCpFluNd(BH$_4$)$_2$Li(THF)]$_2$.

The first monomer (M1) is styrene. The second monomer (M2) is a mixture (E/B) of 80 mol % of ethylene and 20 mol % of 1,3-butadiene.

The conditions for the synthesis of the first block appear in Table 1. Table 1 also indicates the glass transition temperature ("Tg polymer 1st block") of a polymer obtained under the same operating conditions as the synthesis of the first block of the block polymer.

The conditions for the synthesis of the second block appear in Table 2.

The conditions for the synthesis of the second block differ from one test to another and are shown in Table 2.

The characteristics of the block polymers resulting from the tests also appear in Table 2. In Table 2, the writing (S)-(EB) denotes a block polymer, the first block of which is a polystyrene (S) and the second block of which is a copolymer of 1,3-butadiene and of ethylene (EB).

The block polymers of Tests 1 and 2 combine a first block with a microstructure accessible by anionic polymerization and a second block with a microstructure accessible by polymerization catalyzed in the presence of a rare earth metallocene. More particularly still, the block polymer of Test 1 has a microstructure which is all the more novel as the second block contains saturated 6-membered cyclic hydrocarbon units, in the case in point 1,2-cyclohexanediyl, resulting from a specific insertion of the ethylene and 1,3-butadiene monomers into the polymer chain, in addition to the conventional ethylene and 1,3-butadiene units, respectively —(CH$_2$—CH$_2$)—, —(CH$_2$—CH═CH—CH$_2$)— and —(CH$_2$—CH(CH═CH$_2$))—.

TABLE 1

| Synthesis of the first block | |
|---|---|
| M1 | Styrene |
| | 1 ml |
| BuLi | 0.50 ml |
| | (95 µmol) |
| "Tg polymer 1st block" | 44° C. |

TABLE 2

| Test | Metallocene (90 µmol) | M2 | Block polymer | % 1st block | Tg 1st block | Tg 2nd block | M.p. 2nd block |
|---|---|---|---|---|---|---|---|
| 1 | 1 | E/B | (S)-(EB) | 49 | 44° C. | −34° C. | Endothermic phenomenon spread out from −30° C. to −20° C. |
| 2 | 2 | E/B | (S)-(EB) | 52 | — | | −15° C. to 140° C. |

The invention claimed is:

1. A block polymer comprising:
a first block and a second block,
the first block comprising monomer units of a first aromatic α-mono-olefin, the first aromatic α-mono-olefin being of formula CH$_2$═CH—Ar, Ar representing a substituted or unsubstituted aromatic group,
the second block comprising monomer units of a second 1,3-diene and monomer units of a second olefin selected from the group consisting of ethylene, α-mono-olefins and their mixtures,
provided that, if the second block is a copolymer chain of a 1,3-diene and of an aromatic α-mono-olefin of formula CH$_2$═CH—Ar', Ar' representing a substituted or unsubstituted aromatic group, the diene units of trans-1,4-structure in the second block represent more than 80 mol % of the diene units of 1,4-structure of the second block, and
the block polymer containing 1,2-cyclohexanediyl units.

2. The block polymer according to claim 1, in which the Ar group and the Ar' group are, independently of one another, a phenyl group or an aryl group.

3. The block polymer according to claim 1, which block polymer is a diblock.

4. The block polymer polymer according to claim 1, in which the first aromatic α-mono-olefin is styrene.

5. The block polymer polymer according to claim 1, in which the first block comprises more than 0 mol % to 100 mol % of units of the first aromatic α-mono-olefin and from 0 mol % to less than 100 mol % of units of a first 1,3-diene.

6. The block polymer according to claim 5, in which the first 1,3-diene is 1,3-butadiene, isoprene or their mixture.

7. The block polymer according to claim 1, in which the first block is a homopolymer chain of the first aromatic α-mono-olefin.

8. The block polymer according to claim 5, in which the first block is a copolymer chain of the first aromatic α-mono-olefin and of the first 1,3-diene.

9. The block polymer according to claim 1, in which the first block contains more than 10 monomer units.

10. The block polymer according to claim 1, in which the first block is an atactic chain.

11. The block polymer according to claim 1, in which the second block comprises more than 0 mol % to 50 mol % of the monomer units of the second 1,3-diene and from 50 mol % to less than 100 mol % of the monomer units of the second olefin.

12. The block polymer according to claim 1, in which the diene units of trans-1,4-structure in the second block represent more than 80 mol % of the diene units of 1,4-structure of the second block.

13. The block polymer according to claim 1, in which the diene units of trans-1,4-structure in the block polymer represent more than 70 mol % of the diene units of 1,4-structure of the block polymer.

14. The block polymer according to claim 1, in which the second 1,3-diene is 1,3-butadiene.

15. The block polymer according to claim 1, in which the second block is a copolymer chain of 1,3-butadiene and of ethylene or a terpolymer chain of 1,3-butadiene, of ethylene and of an α-mono-olefin.

16. The block polymer according to claim 1, in which the first block is covalently bonded to the second block by direct joining of a carbon atom of a monomer unit of the first block to a carbon atom of a monomer unit of the second block.

17. The block polymer according to claim 1, in which the first block includes an atactic polystyrene, and the second block includes a copolymer of 1,3-butadiene and of ethylene (EB).

* * * * *